United States Patent
Gillett et al.

[19]

[11] Patent Number: 5,959,380
[45] Date of Patent: Sep. 28, 1999

[54] PREVENTION OF PARTICLE ACCUMULATION BETWEEN ROTATABLE COMPONENTS OF AN ELECTRICAL MACHINE

[75] Inventors: Anthony W. Gillett; William C. Motion, both of Gloucestershire, United Kingdom

[73] Assignee: Camco Drilling Group Ltd., Stonehouse, United Kingdom

[21] Appl. No.: 08/799,623

[22] Filed: Sep. 3, 1996

[30] Foreign Application Priority Data

Sep. 8, 1995 [GB] United Kingdom .................... 9518266

[51] Int. Cl.$^6$ ........................................................ H02K 9/00
[52] U.S. Cl. .......................... 310/54; 310/67 R; 310/68 R; 310/87; 310/90; 417/405; 417/406; 417/408
[58] Field of Search ..................................... 310/54, 67 R, 310/87, 90, 68.2; 415/72, 221, 71; 417/408, 405, 406

[56] References Cited

U.S. PATENT DOCUMENTS

| | | | |
|---|---|---|---|
| 1,841,302 | 1/1932 | Simmons ................................... | 310/90 |
| 2,246,777 | 6/1941 | Bordeaux et al. ......................... | 310/87 |
| 4,553,857 | 11/1985 | Ney ........................................ | 284/398 |
| 4,996,613 | 2/1991 | Hishida .................................. | 360/99.08 |
| 5,017,087 | 5/1991 | Sneddon .................................. | 415/72 |
| 5,184,945 | 2/1993 | Chi-Wei .................................. | 417/420 |
| 5,220,231 | 6/1993 | Veronesi et al. ......................... | 310/90 |
| 5,275,238 | 1/1994 | Cameron ................................. | 166/105 |
| 5,295,810 | 3/1994 | Heijnen .................................. | 417/408 |

FOREIGN PATENT DOCUMENTS

| | | |
|---|---|---|
| 0461918 | 12/1991 | European Pat. Off. . |
| 1044727 | 11/1953 | France . |
| 1109208 | 1/1956 | France . |
| 2486820 | 1/1982 | France . |
| 1077485 | 7/1967 | United Kingdom . |
| 2082653 | 3/1982 | United Kingdom . |
| 2214541 | 9/1989 | United Kingdom . |
| 2257182 | 1/1993 | United Kingdom ...................... 310/87 |
| 2259316 | 3/1993 | United Kingdom ...................... 310/87 |
| 2298217 | 8/1996 | United Kingdom ...................... 310/87 |

OTHER PUBLICATIONS

L.P. Ludwig et al. "hermetically sealed pump" Mechanical Engineering (Inc. Cime) vol. 91, No. 12, Dec. 1969, New York.

*Primary Examiner*—Elvin G. Enad

[57] ABSTRACT

An electrical machine, such as an electric motor, generator or torquer-generator, includes a relatively rotatable cylindrical armature and magnetic pole structure separated by an annular gap into which a surrounding fluid may flow during operation of the machine. In order to prevent the build-up of deposited solid material in the gap between the components, one of the components is provided at its surface with a narrow elongate projection which extends helically along and around the surface. The height of the projection is slightly less than the gap between the components so that it remains out of contact with the surface of the other component so as not to frictionally engage it and interfere with relative rotation between the components.

20 Claims, 3 Drawing Sheets

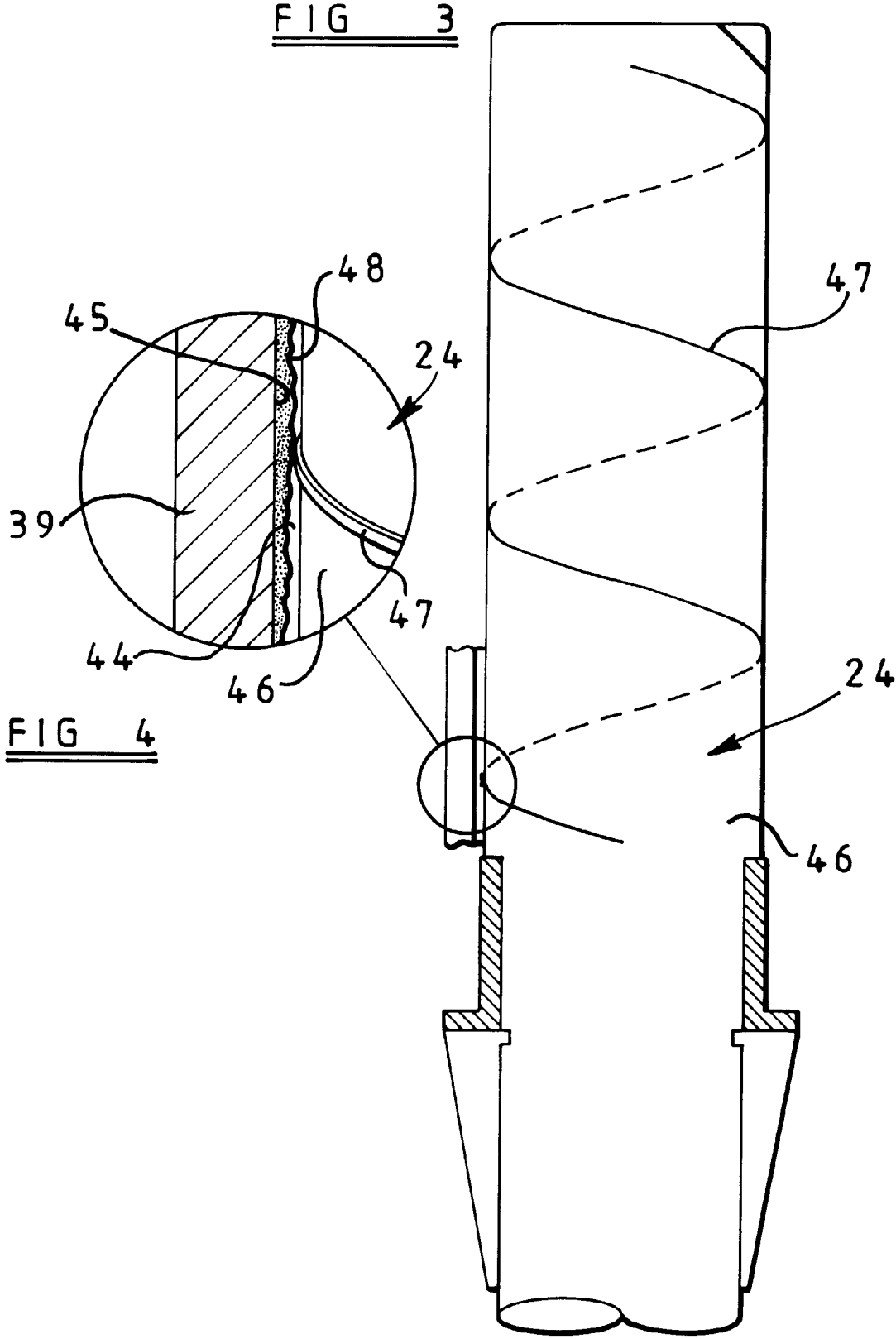

PREVENTION OF PARTICLE ACCUMULATION BETWEEN ROTATABLE COMPONENTS OF AN ELECTRICAL MACHINE

BACKGROUND OF THE INVENTION

1. Field of the Invention

The invention relates to electrical machines of the kind having two relatively rotatable components with respective opposed surfaces separated by a gap into which a surrounding fluid may flow during operation of the machine. Examples of such machines are electric motors, generators and torquer-generators comprising a relatively rotatable armature and magnetic pole structure separated by a gap, which is usually annular, but the invention is generally applicable to any other type of electrical machine having spaced relatively rotatable surfaces.

2. Description of Related Art

In circumstances where the electrical machine is required to operate within a surrounding fluid, it may be advantageous or necessary for the fluid to flow through the gap between the relatively rotatable surfaces. For example, the fluid may be used to lubricate bearings supporting the relatively rotatable components or to cool one or both of the components. Alternatively the circumstances and construction may be such that it is difficult or impossible to provide a rotating seal which will reliably prevent flow of the fluid into the gap. In these circumstances the problem may arise that material entrained in the fluid, and especially magnetic material, may become deposited within the gap as the fluid flows through it and such deposit may increase to an extent where it interferes with, or even prevents, the effective operation of the machine.

For example, British Patent Specification No. 2257182 describes a roll stabilised instrument package system for use down a borehole in the earth for controlling a rotary drilling system. The system comprises an instrument carrier which is mounted within a drill collar for rotation about the longitudinal axis of the collar. An impeller is rotatably mounted in bearings on the instrument carrier and carries a pole structure which co-operates across an annular gap with an armature within the instrument carrier, so as to act as a torquer-generator. During operation drilling fluid flows along the drill collar and around the instrumentation package system. The impeller rotates the carrier relative to the drill collar as a result of the flow of drilling fluid through the impeller and the torque transmitted by the impeller to the instrument carrier is controlled so as to maintain the carrier nonrotating in space and hence roll stabilised, or to rotate the carrier in a required manner for other control purposes.

The bearings between the impeller and instrument carrier may be lubricated by the drilling fluid which flows into the annular gap between the impeller and the instrument carrier. The drilling fluid, or mud, normally comprises fine powder particles in suspension in a liquid, which is usually water or an invert oil emulsion in water. In the course of drilling, the drilling fluid carries cuttings from the formation being drilled upwardly to the surface through the annulus between the drill string and the walls of the borehole. At the surface most of the formation material is removed from the drilling mud by shale shakers and hydrocyclones before the mud is pumped back down the hole through the drill string. However, the filtering processes are not perfect and some fine solid particles from the formation become entrained in the drilling fluid.

In drilling some types of formation, such as formations including magnetite, a proportion of the formation particles entrained in the drilling fluid may be magnetic. Also, although the basic powder material in suspension in the drilling fluid is usually nominally non-magnetic, it is commonly found that such material contains magnetic impurities. There is a tendency for any such magnetic particles to become deposited on the internal surface of the pole structure as the fluid passes through the gap between the pole structure and the instrument carrier, as a result of the magnetic attraction of the pole structure. The present invention provides an arrangement whereby in these, or similar circumstances in other electrical machines, the build-up of such deposited particles may be prevented from interfering significantly with the operation of the electrical machine.

SUMMARY OF THE INVENTION

According to the invention there is provided an electrical machine of the kind having two relatively rotatable components with respective opposed surfaces separated by a gap into which a surrounding fluid may flow during operation of the machine, at least one of said components being provided with a structure upstanding from said one surface thereof and extending partly across said gap towards the surface of the other component, but being out of contact with said other surface, the surface area of the extremities of the upstanding structure, nearest said other surface, being less than half the overall area of said one surface, including the upstanding structure.

Preferably the surface area of the extremities of the upstanding structure, nearest said other surface, is less than 25% of the overall area of said one surface, including the upstanding structure.

The electrical machine may, for example, comprise an electric motor, generator or torquer-generator including an armature incorporated in one of said components and a magnetic pole structure incorporated in the other component. The pole structure may comprise permanent magnets and/or electro magnets. In this case the upstanding structure is preferably provided on the component incorporating the armature. If the fluid contains magnetic particles, such particles tend to be attracted to the surface of the other component, incorporating the pole structure. The upstanding structure on said one component then serves to limit or prevent build-up of magnetic particles on said surface and across the gap between the surfaces.

In a conventional electrical machine incorporating a relatively rotatable armature and pole structure, the surface of either component may comprise a series of alternating grooves and lands. For example, the outer surface of the armature may comprise grooves, in which the windings are located, separated by teeth provided by the laminated structure around which the windings are wound. Similarly, the salient poles of the pole structure may be separated by grooves.

In either case the grooves may be partly filled with solidified material, such as epoxy resin, to protect the armature windings from damage or from attack by surrounding fluid, or to prevent magnetic short circuiting between the salient poles of the pole structure by accumulation of magnetic particles in the grooves between them. Although the teeth of the armature or the salient poles of the pole structure might then be regarded as providing an upstanding structure, it is not intended that such arrangements should be considered to fall within the scope of the present invention since, in each case, the area of the teeth of the armature, or of the salient poles of the pole structure, will normally constitute more than half the overall surface area of the armature or pole structure respectively.

In arrangements according to the invention including an armature and pole structure the armature is preferably covered by a substantially continuous surface from which said upstanding structure projects. Such surface may be provided by a material, such as synthetic resin, which is applied over the armature to completely fill the grooves in which the windings are located, or may be provided by a separate layer of non-magnetic material overlying the armature. Thus, in the case where the armature is substantially cylindrical the separate layer may comprise a tubular sleeve of non-magnetic material enclosing the armature. Preferably a solidified material, such as epoxy resin, also fills the winding grooves and any other spaces between the armature and the tubular sleeve.

In any of the arrangements according to the invention, the upstanding structure is preferably disposed to sweep across substantially the whole area of said other surface during each revolution of the relative rotation between the components.

The upstanding structure may comprise a single projection extending substantially continuously across said one surface, or may comprise a plurality of separate projections spaced apart across said surface but overlapping as viewed in the direction of relative movement between said components.

During operation of the electrical machine, the upstanding structure will create turbulence in the fluid adjacent said other surface and this may, in itself, tend to inhibit the deposit of particles on that surface. However, even if particles are deposited, they will eventually accumulate in a layer to a depth at which the particles in the upper part of the layer will be physically dislodged by the upstanding structure on said one surface sweeping across the deposited layer. The dislodged particle will continually be entrained in the fluid flowing through the gap and carried out of the gap with the fluid. At the same time, the fact that the structure is out of contact with the surface of the other component means that the presence of the structure does not significantly interfere with the normal relative rotation between the components of the machine.

Preferably, however, the upstanding structure is configured also to act on the fluid in the gap, during relative rotation between the components, in a manner to promote a flow of the fluid through the gap. In this case the structure will not only dislodge particles from said other surface but will also tend to positively promote the flow of fluid and particles through the gap.

The upstanding structure may provide at least one edge surface inclined at an angle, e.g. at 90°, to said one surface. Preferably the length of said surface extends at an angle greater than 0° and less than 90° to the direction of relative movement between said surfaces at the location of said edge surface, for example at an angle greater than 10° and less than 60° to said direction.

The edge surface may be provided on at least one projection upstanding from said one surface and extending partly across the gap towards the other surface.

The projection may, for example, be a separately formed member mounted on said one component, or it may be a land left upstanding between recesses or grooves formed in said one component.

The projection may be elongate and may be of substantially constant cross-section, for example it may be of generally rectangular cross-section.

Where there are provided a plurality of said projections spaced apart over said one surface, the projections may be elongate and may be substantially parallel to one another.

Said relatively rotatable surfaces of the electrical machine may be surfaces of revolution, for example cylindrical or frusto-conical surfaces, rotating about a common longitudinal axis so that the gap between the surfaces is annular. The or each projection may then extend around said one surface in generally helical or part-helical fashion. Preferably each projection extends helically, and preferably continuously, from adjacent one axial end of the surface to adjacent the opposite axial end thereof. The pitch of the helix may be substantially constant or may vary along the length thereof.

Alternatively the surfaces may be substantially flat planar surfaces rotating about a common transverse axis, and in this case the or each projection may extend across said one surface in generally spiral fashion.

In any of the above arrangements according to the invention the electrical machine may be particularly adapted for use downhole in a system for drilling holes in subsurface formations, such as in drilling for oil or gas. In this case the machine may be adapted to allow a flow of drilling fluid into, or through, said gap between the relatively rotatable components of the machine.

BRIEF DESCRIPTION OF THE DRAWINGS

FIG. 3 is a diagrammatic side elevation of the inner instrument carrier of the instrument package showing an upstanding structure according to the invention, and FIG. 4 is an enlarged part-section, part-side elevation showing the gap between the relatively rotating parts of the instrument package.

DETAILED DESCRIPTION OF THE PREFERRED EMBODIMENT

The invention will be described in relation to a torquer-generator forming part of a roll stabilised instrument package for use downhole to control a rotary steerable drilling system. However, it is to be understood that this is merely by way of example and that a torquer-generator for such specific purpose is only one example of the very many types of electrical machine to which the present invention may be applied.

Figure 1:
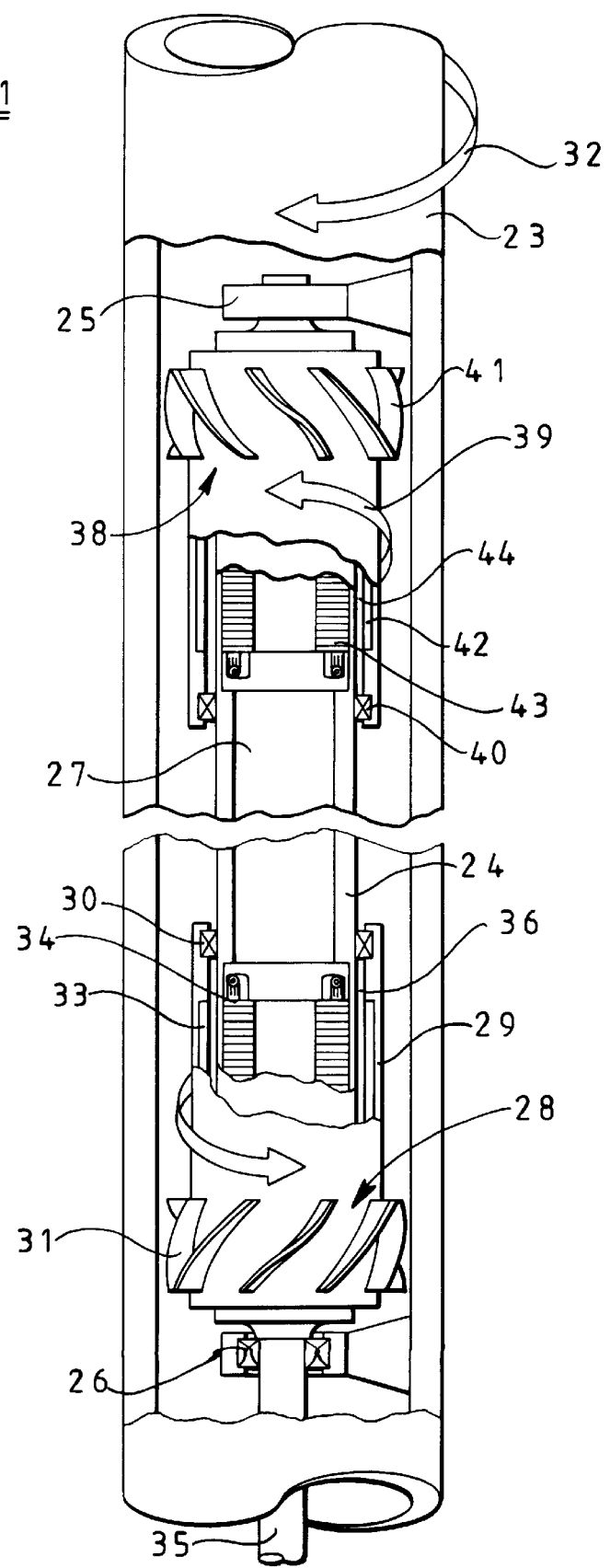
FIG. 1 is a diagrammatic longitudinal section through a roll stabilised instrument package for use downhole in rotary steerable drilling, and incorporating the present invention.

Referring to FIG. 1, the instrument package, or control unit, comprises an elongate generally cylindrical hollow instrument carrier 24 mounted in bearings 25, 26 supported within a drill collar 23, for rotation relative to the drill collar 23 about the central longitudinal axis thereof. The carrier has one or more internal compartments which contain an instrument package 27 comprising sensors for sensing the rotation and orientation of the control unit, and associated equipment for processing signals from the sensors and controlling the rotation of the carrier.

At the lower end of the control unit a multi-bladed impeller 28 is rotatably mounted on the carrier 24. The impeller comprises a cylindrical sleeve 29 which encircles the carrier and is mounted in bearings 30 thereon. The blades 31 of the impeller are rigidly mounted on the lower end of the sleeve 29. During drilling operations the drill string, including the drill collar 23, will normally rotate clockwise, as indicated by the arrow 32, and the impeller 28 is so designed that it tends to be rotated anticlockwise as a result of the flow of drilling fluid down the interior of the collar 23 and across the impeller blades 31.

The impeller 28 is coupled to the instrument carrier 24 by an electrical torquer-generator. The sleeve 29 contains around its inner periphery a pole structure comprising an array of permanent magnets 33 cooperating with an armature 34 within the carrier 24. There is an annular gap 36 between the inner surface of the sleeve 29 and the outer surface of the carrier 24. The pole/armature arrangement serve as a variable drive coupling between the impeller 28 and the carrier 24.

As the drill collar 23 rotates during drilling, the main bearings 25, 26 apply a clockwise input torque to the carrier 24 and this is opposed by an anticlockwise torque applied to the carrier by the impeller 28. This anticlockwise torque is varied by varying the electrical load on the generator constituted by the magnets 33 and the armature 34. This variable load is applied by a generator load control unit under the control of a computer in the instrument package 27.

Mounted adjacent the upper end of the carrier 24 is a second impeller 38 which is generally similar in construction to the lower impeller 28 and comprises a cylindrical sleeve 39 which encircles the carrier casing and is mounted in bearings 40 thereon. The blades 41 of the impeller are rigidly mounted on the upper end of the sleeve 39. The blades of the impeller are so designed that the impeller tends to be rotated clockwise as a result of the flow of drilling fluid down the interior of the collar 23 and across the impeller blades 41.

Like the impeller 28, the impeller 38 is coupled to the carrier 24 by an electrical torquer-generator. The sleeve 39 contains around its inner periphery an array of permanent magnets 42 cooperating with a fixed armature 43 within the casing 24. The magnet/armature arrangement serves as a variable drive coupling between the impeller 38 and the carrier. As is the case with the lower impeller 28, the torque applied to the carrier by the upper impeller may be varied by varying the electrical load on the upper torquer-generator. By selectively varying the torque applied to the carrier 24 by each torquer-generator, control means in the instrument package may be commanded to cause any required torque, within a permitted range, to be applied to the carrier by the difference between the torque supplied by the two impellers.

The output of the control unit is in the form of a shaft 35 mounted on the carrier 24, the shaft 35 controlling operation of a modulated bias unit which in turn steers an associated drill bit at the bottom of the drill string.

The detailed operation of the control unit, and the construction and operation of the associated modulated bias unit and drill bit do not form a part of the present invention and will not therefore be described in detail. However, arrangements of this kind are described in further detail in British Patents Nos. 2257182 and 2259316, and in British Patent Application No. 9503828.7.

Figure 2:
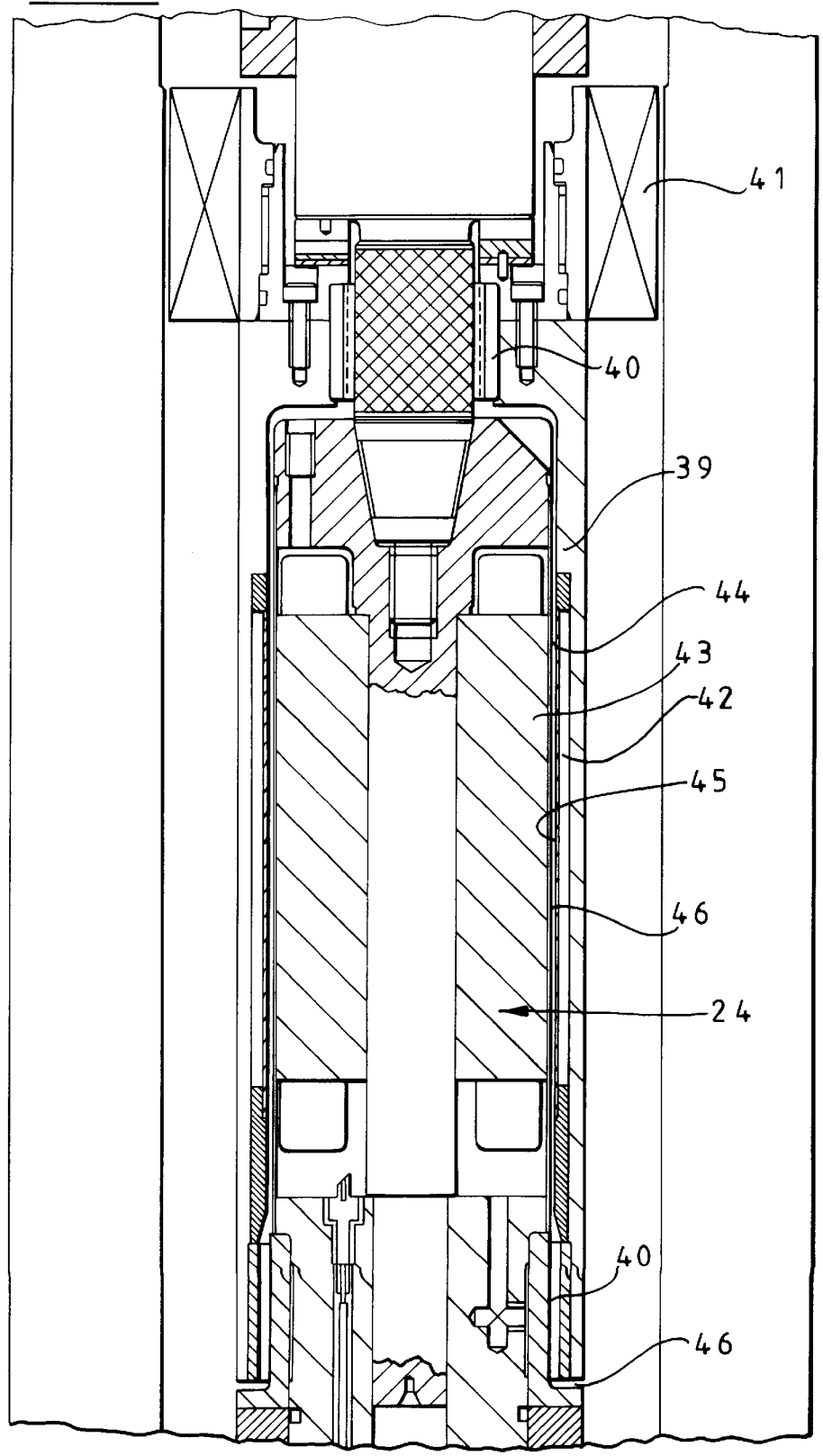
FIG. 2 is a more detailed sectional view of part of the roll stabilised package shown in FIG. 1.

FIG. 2 shows in greater detail the construction of the torquer-generator driven by the upper impeller 38. As will be seen from this figure there is a narrow annular gap 44 between the inner cylindrical surface 45 of the sleeve 39 and the outer cylindrical surface 46 of the instrument carrier 24.

Drilling fluid flowing downwardly through the interior of the drill collar and across the impeller blades 41 is used to lubricate the bearings 40 supporting the sleeve 39 on the instrument carrier 24 and the drilling fluid thus flows downwardly through the upper bearings 40, through the gap 44 and over the lower bearings 40 before escaping through an annular gap 46 back into the interior of the drill collar. The flow of drilling fluid also serves to cool the armature.

As is well known, drilling fluid comprises solid particles entrained in a liquid which is usually water or an invert oil emulsion in water. The particles include particles from the earth formation being drilled since one of the purposes of the drilling fluid is to carry cuttings from the formation to the surface where the drilling fluid is filtered before being again pumped down the drill string.

Since the annular gap of 44 is narrow there may be a tendency for particles in the drilling fluid to be deposited in the gap 45 during operation of the control unit. This is particularly the case where the formation includes material, such as magnetite, having magnetic properties, or where the basic powder suspended in the drilling fluid includes magnetic particles, such as magnetic impurities. Such magnetic particles tend to be attracted to the inwardly facing surface 45 of the sleeve 39 which lies adjacent the permanent magnets 42 within the sleeve. Such particles may then separate from the drilling fluid flowing downwardly along the gap 44 and become deposited on the inner surface 45 of the sleeve 39. Deposit of the particles may occur anywhere over the surface area of the sleeve, but is particularly likely to occur in the regions of the poles of the permanent magnets 42.

If the deposit of such material within the gap 44 continues, the build-up of material in the gap tends to increase the torque applied to the carrier 24 by the impeller 41 and sleeve 39 and this may interfere with the required rotation or rotational positioning of the carrier 24, since this depends on the torque applied to the carrier.

In accordance with the present invention, the build-up of deposited solid material in the gap 44 is prevented by providing an upstanding structure on the outer surface 46 of the carrier 24. In the arrangement described, the upstanding structure comprises a narrow elongate projection 47 which extends helically along and around the outer surface 46 of the carrier 24.

In the present example the projection 47 is provided by welding an elongate metal rectangular strip to the outer surface of the metal carrier 24. The height of the strip 47 is such that it extends part of the way across the annular gap 44, but remains out of contact with the inner cylindrical surface 45 of the sleeve 39 so as not to frictionally engage that sleeve and interfere with normal relative rotation between the carrier 24 and sleeve 39. Typically the width of the annular gap 44 might be 1.5 mm, and the height of the projecting strip 47 might be 1.3 mm, leaving a gap of 0.2 mm between the outer surface of the strip 47 and the inner surface 45 of the sleeve 39.

The width of the strip 47 is such that the surface area of the outer extremity of the strip, nearest the surface 45, is considerably less than half the overall area of the surface of the carrier 24 on which the strip is mounted.

Since the length of any given portion of the helical strip 47 is inclined to the direction of relative rotation between the carrier 24 and the sleeve 39, the strip 47 tends to induce an axial flow to any material in the gap 44. In the arrangement shown the direction of the helix is such that the direction of flow it induces as a result of relative rotation is downwards through the annular gap 44.

Normally therefore, the effect of the helical strip 47 is to tend to enhance the downward flow of drilling fluid through the gap 44. However, if there is a build-up of magnetic material on the inner surface 45 of the sleeve 39, as indicated at 48 in FIG. 4, such build-up will eventually contact the strip 47 which will dislodge at least the surface of such material from the sleeve 39 and cause it to become once again entrained in the drilling fluid so as to flow downwardly with such fluid. In practice, therefore, the presence of the strip 47 allows a build-up of magnetic material 48 only to a depth of 0.2 mm between the inner surface of the sleeve 39 and the outer surface of the strip 47. The strip 47 therefore effectively prevents build-up of deposits of magnetic material to reach an extent to which it can interfere significantly with the relative rotation between the components.

Although it may be convenient to provide the projection 47 by applying a separately formed helical strip to the outer surface of the carrier 24, it will be appreciated that a similar effect may be obtained by providing a carrier 24 of correspondingly greater wall thickness and then forming a wide helical groove or channel in the outer surface of the wall of the carrier 24, so as to leave between the convolutions of the groove or channel an upstanding land which may correspond in shape and dimensions to the projection strip 47.

The helix may be of any convenient pitch angle and although a comparatively shallow pitch angle is shown in FIG. 3 by way of example, any appropriate pitch angle may be employed. In the arrangement shown only a single helical strip is provided, but it will be appreciated that two or more interleaved helical strips or lands may be formed on the outer surface of the carrier 24.

Although the strip 47 extends in a direction so as to induce flow downwardly, in some circumstances it may be desirable for the arrangement to be such that the helical strip tends to cause upward flow. Alternatively, instead of the helical strip being continuous in one direction it may be replaced by shorter helical sections spaced apart along the length of the carrier 24 in which case some sections may be arranged to impart downward flow and some sections arranged to impart upward flow.

The structure on the outer surface 46 of the carrier 24 does not necessarily have to be a helical structure or a series of helical structures. For example the structure might comprise any other shape or configuration of projection or texture on the surface which extends partly across the gap 44 and which will serve to dislodge material deposited on the surface 45 of the other sleeve 39. Thus the structure might comprise any number of spaced projecting forms on the surface 46, and such forms preferably have edges inclined to the direction of relative rotation so as to induce flow in the fluid. In any arrangement, however, it is desirable that the structure or structures on the carrier are such that in a single rotation they, in combination, sweep at least once over substantially the entire inner surface area 45 of the sleeve 39, although arrangements are also possible where the structures only sweep across regions of the surface 45 where build-up of deposits is likely to occur.

Although in the arrangements shown it is preferable for the structure to be on the surface of the inner component of the relatively rotating components, in other applications it may be preferable for the structure to be provided on the inwardly facing surface of the outer of the two relatively rotating components. In a further alternative arrangement, structures may be provided on both components, the outer extremity of the structure on the inner component being out of contact with the inner extremity of the projecting structure on the outer component.

As previously mentioned, the invention is not only applicable to electrical machines operating in circumstances where the fluid flowing through the gap contains magnetic material, but may also be used in any other circumstances where there may be a tendency for solid material to be deposited within the gap between the relatively rotating components.

Although the invention has been described in relation to a torquer-generator for use in a specific application, it should be emphasised that the invention is not limited to such use and may be applied to any type of electrical machine having relatively rotatable surfaces between which is a gap through which fluid may flow during operation. For example, the invention may be equally applicable to electrical generators, electric motors, such as stepper motors, or to tacho-generators.

As previously mentioned, the invention may also be applied to electrical machines having relatively rotatable flat planar surfaces rotating about a transverse axis and separated by a gap. In this case the appropriate structure may be applied to either or both of the surfaces, provided that the structure on one surface remains out of contact with the other surface or structure thereon. The structure on the or each surface may be arranged to induce flow in either an inward or outward direction with respect to the axis of rotation, or may be arranged to induce flow in both directions.

Whereas the present invention has been described in particular relation to the drawings attached hereto, it should be understood that other and further modifications, apart from those shown or suggested herein, may be made within the scope and spirit of the present invention.

What is claimed:

1. An electrical machine, for use in boreholes in subsurface formations, comprising two relatively rotatable components incorporating an armature and a magnetic pole structure respectively, said components having respective opposed surfaces separated by a gap into which may flow, during operation of the machine, a surrounding fluid in which particles are entrained, at least one of said components being provided with a structure upstanding from the surface thereof and extending partly across said gap towards the surface of the other component, extremities of the upstanding structure, nearest the surface of said other component, having a total surface area which is less than half the overall area of the surface of said one component, including the upstanding structure, and said extremities of the upstanding structure being out of contact with the surface of the other component whereby relative motion between the upstanding structure and said surface, as the components rotate relative to one another, inhibits the settlement and accumulation of particles from said fluid in the gap between the components.

2. An electrical machine according to claim 1, wherein the surface area of the extremities of the upstanding structure, nearest the surface of said other component, is less than 25% of said overall area of the surface of said one component, including the upstanding structure.

3. An electrical machine according to claim 1, wherein said armature is incorporated in said one component and the magnetic pole structure is incorporated in the other component, so that the upstanding structure is provided on the component incorporating the armature.

4. An electrical machine according to claim 3, wherein the armature is covered by a substantially continuous surface from which said upstanding structure projects.

5. An electrical machine according to claim 4, wherein said substantially continuous surface is provided by a separate layer of non-magnetic material overlying the armature.

6. An electrical machine according to claim 5, wherein the armature is substantially cylindrical and the separate layer comprises a tubular sleeve of non-magnetic material enclosing the armature.

7. An electrical machine according to claim 6, wherein a solidified material fills spaces between the armature and the tubular sleeve.

8. An electrical machine according to claim 1, wherein the upstanding structure is disposed to rotate around substantially the whole area of the surface of said other component during each revolution of the relative rotation between the components.

9. An electrical machine according to claim 8, wherein the upstanding structure comprises a single projection extending substantially continuously across the surface of said one component.

10. An electrical machine according to claim 8, wherein the upstanding structure comprises a plurality of separate projections spaced apart across the surface of said one component but overlapping as viewed in the direction of relative rotational movement between the components.

11. An electrical machine according to claim 1, wherein the upstanding structure is configured also to act on the fluid in the gap, during relative rotation between the components, in a manner to promote a flow of the fluid through the gap.

12. An electrical machine according to claim 11, wherein the upstanding structure provides at least one edge surface inclined at an angle to the surface of said one component.

13. An electrical machine according to claim 12, wherein the length of said edge surface extends at an angle greater than 0° and less than 90° to the direction of relative movement between said surfaces at the location of said edge surface.

14. An electrical machine according to claim 13, wherein the length of said edge surface extends at an angle greater than 10° and less than 60° to said direction of relative movement.

15. An electrical machine according to claim 1, wherein the upstanding structure includes a projection which is a separately formed member mounted on said one component.

16. An electrical machine according to claim 15, wherein the projection is elongate and of substantially constant cross-section.

17. An electrical machine according to claim 15, wherein there are provided a plurality of said projections spaced apart over the surface of said one component, and wherein the projections are elongate and substantially parallel to one another.

18. An electrical machine according to claim 1, wherein said relatively rotatable surfaces of the electrical machine are surfaces of revolution rotating about a common longitudinal axis so that the gap between the surfaces is annular.

19. An electrical machine according to claim 18, wherein the projection extends around said one surface in generally helical fashion.

20. An electrical machine according to claim 19, wherein the projection extends helically, and substantially continuously, from adjacent one axial end of the surface to adjacent the opposite axial end thereof.

* * * * *